US007964523B2

(12) United States Patent
Mayumi et al.

(10) Patent No.: US 7,964,523 B2
(45) Date of Patent: Jun. 21, 2011

(54) COMPOSITION FOR SEALING GLASS

(75) Inventors: Yoshitaka Mayumi, Hyogo (JP);
Hideyuki Kuribayashi, Hyogo (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 320 days.

(21) Appl. No.: 12/214,543

(22) Filed: Jun. 19, 2008

(65) Prior Publication Data
US 2009/0318278 A1    Dec. 24, 2009

(51) Int. Cl.
C03C 3/064    (2006.01)
C03C 3/068    (2006.01)
C03C 3/066    (2006.01)
C03C 8/14     (2006.01)
C03C 8/20     (2006.01)
C03C 8/02     (2006.01)

(52) U.S. Cl. ............... 501/77; 501/78; 501/79; 501/17; 501/18; 501/21

(58) Field of Classification Search ............ 501/14, 501/15, 17, 18, 19, 21, 26, 73, 77, 78, 79
See application file for complete search history.

(56) References Cited

U.S. PATENT DOCUMENTS

| 4,358,541 | A | * | 11/1982 | Andrus et al. | 501/5 |
| 4,385,127 | A | * | 5/1983 | Chyung | 501/5 |
| 4,965,229 | A | * | 10/1990 | Nishino et al. | 501/14 |
| 6,362,119 | B1 | * | 3/2002 | Chiba | 501/15 |

FOREIGN PATENT DOCUMENTS

| JP | 8-134434 | 5/1996 |
| JP | 2003-238201 | 8/2003 |
| JP | 2004-123496 | 4/2004 |
| JP | 2007-161569 A | * 6/2007 |

* cited by examiner

Primary Examiner — Jerry Lorengo
Assistant Examiner — Noah S Wiese
(74) Attorney, Agent, or Firm — Hamre, Schumann, Mueller & Larson, P.C.

(57) ABSTRACT

A powder composition for forming a highly expansible crystallized glass substantially free of alkali metals is disclosed, which composition can provide, through its firing at a temperature of not more than 900° C., a seal between metal and ceramic. The powder composition is a powder composition for the formation of a sealing crystallized glass which is substantially free of alkali metals and consists of the powder of a glass containing, calculated as oxides, $SiO_2$: 10-30% by mass, $B_2O_3$: 20-30% by mass, CaO: 10-40% by mass, MgO: 15-40% by mass, BaO+SrO+ZnO: 0-10% by mass, $La_2O_3$: 0-5% by mass, $Al_2O_3$: 0-5% by mass, and $RO_2$: 0-3% by mass (wherein R represents Zr, Ti, or Sn), wherein the crystallized glass that is formed by firing the powder composition at 900±50° C. has a coefficient of thermal expansion of 90-120× $10^{-7}$/° C. at 50-550 ° C.

10 Claims, 2 Drawing Sheets

COMPOSITION FOR SEALING GLASS

TECHNICAL FIELD

The present invention relates to a glass composition that is used for providing a seal between metal and ceramic, metal and metal, or ceramic and ceramic, and more specifically to a sealing glass composition which is used as a sealant for sealed parts of solid oxide fuel cells (SOFC), for example, a sealed part between a cell of SOFC and a fuel manifold to which the former is attached.

BACKGROUND ART

As a sealant for solid oxide fuel cells (SOFC), a mixture powder has been used consisting of an amorphous glass powder and a ceramic powder which has a high coefficient of thermal expansion (see Patent Document 1). With this sealant, however, there has been a problem that its application is limited only to such structural parts that are stably supported already and do not require a sealant to sustain any load (including its own weight), for at the operation temperatures of solid oxide fuel cells, which is very high like 700-1000° C., there occurs reduction of high-temperature viscosity of the amorphous glass, rendering the sealant more likely to undergo deformation and even hardly capable of sustaining itself.

Further, there have also been proposed a crystallized glass in which lithium disilicate is primarily precipitated or a $SiO_2$—$Al_2O_3$—ZnO—$K_2O$—$Na_2O$-based amorphous glass (see Patent Documents 2 and 3, respectively). However, these sealants contain a large amount of alkali metals either in the crystalline phase precipitated from the starting glass or in the remaining glass phase. Therefore, they have problems in respect to durability of their insulation property and sealing integrity, and are expected, after prolonged use of the SOFC, to become more likely to end in failure of insulation or breakage of the seal, under the influence of high-temperature and humid conditions in which it operates.

[Patent Document 1] Japanese Patent Application Publication H8-134434

[Patent Document 2] Japanese Patent Application Publication 2003-238201

[Patent Document 3] Japanese Patent Application Publication 2004-123496

DISCLOSURE OF THE INVENTION

The Problem to be Solved by the Invention

Against the above background, the objective of the present invention is to provide a glass composition for forming a highly expansible crystallized glass substantially free of alkali metals, which composition, through firing at a temperature not higher than 900° C., can provide a seal between metal and ceramic.

The Means to Solve the Problem

As a result of studies addressed to solving the above problem, the present inventors found that a $SiO_2$—$B_2O_3$—CaO—MgO-based glass composition, if its combination of ingredients falls within a certain range, will give, through firing its powder of the glass at about 900° C., a crystallized glass having a coefficient of thermal expansion of 90-120×10$^{-7}$/° C. (50-550° C.), a value which is compatible to metals and ceramics. The present invention is completed through further studies on the basis of this finding.

Thus, the present invention provides what follows.

(1) A glass composition substantially free of alkali metals comprising, calculated as oxides,

| | |
|---|---|
| $SiO_2$ | 10-30% by mass, |
| $B_2O_3$ | 20-30% by mass, |
| CaO | 10-40% by mass, |
| MgO | 15-40% by mass, |
| BaO + SrO + ZnO | 0-10% by mass, |
| $La_2O_3$ | 0-5% by mass, |
| $Al_2O_3$ | 0-5% by mass, and |
| $RO_2$ | 0-3% by mass (wherein R represents Zr, Ti, or Sn), | wherein the crystallized glass which is formed by firing at 900±50° C. the powder that is made of the glass composition has a coefficient of thermal expansion of 90-120×10$^{-7}$/° C. at 50-550° C.

(2) The glass composition according to 1 above, wherein the ratio by mass of CaO content/MgO content is 0.4-2.0.

(3) The glass composition according to 1 or 2 above, wherein the ratio by mass of $SiO_2$ content/$B_2O_3$ content is 0.33-1.33.

(4) The glass composition according to one of 1 to 3 above, wherein the sum total of the content of $SiO_2$ and $B_2O_3$ is 30-50% by mass, and wherein the sum total of the content of CaO and MgO is 44-65% by mass.

(5) A glass powder consisting of the glass composition according to one of 1 to 4 above, wherein the mean particle size thereof is 5-250 μm.

(6) A glass-ceramic powder comprising 100 parts by mass of a glass powder consisting of the glass composition according to one of 1 to 4 above and 0.01-20 parts by mass of zirconia powder.

(7) A glass-ceramic powder comprising a glass powder consisting of the glass composition according to one of 1 to 4 above and one or more ceramic powders selected from the group consisting of magnesia, forsterite, steatite, wollastonite, and a precursor thereof, wherein the glass-ceramic powder contains, per 100 parts by mass of the glass powder, 0.01-5 parts by mass of the one or more ceramic powders selected from the group consisting of magnesia, forsterite, steatite, wollastonite, and a precursor thereof.

(8) The glass-ceramics powder according to 6 or 7 above, wherein the mean particle size of the glass powder is 5-250 μm.

Effect of the Invention

According to the present invention defined as above, a powder of the glass composition can be provided which is substantially free of alkali metals and, through firing, crystallizes to give a crystallized glass having a high coefficient of thermal expansion. Thus, the powder can be used as a sealant where a seal is needed between metal and ceramic, metal and metal, or ceramic and ceramic, which are used at high temperatures (e.g., sealed parts of solid oxide fuel cells or exhaust gas sensors). As the sealant will not undergo impairment of its insulation property after prolonged exposure, e.g., as a part of solid oxide fuel cells, to conditions of high temperatures of 700-1000° C. together with high humidity, and as no loss of its viscosity will take place at such high temperatures, the powder used as a sealant in sealed parts of solid oxide fuel cells and the like will enhance the durability of the sealed parts' insulation property and sealing integrity.

BEST MODE FOR CARRYING OUT THE INVENTION

Figure 1:
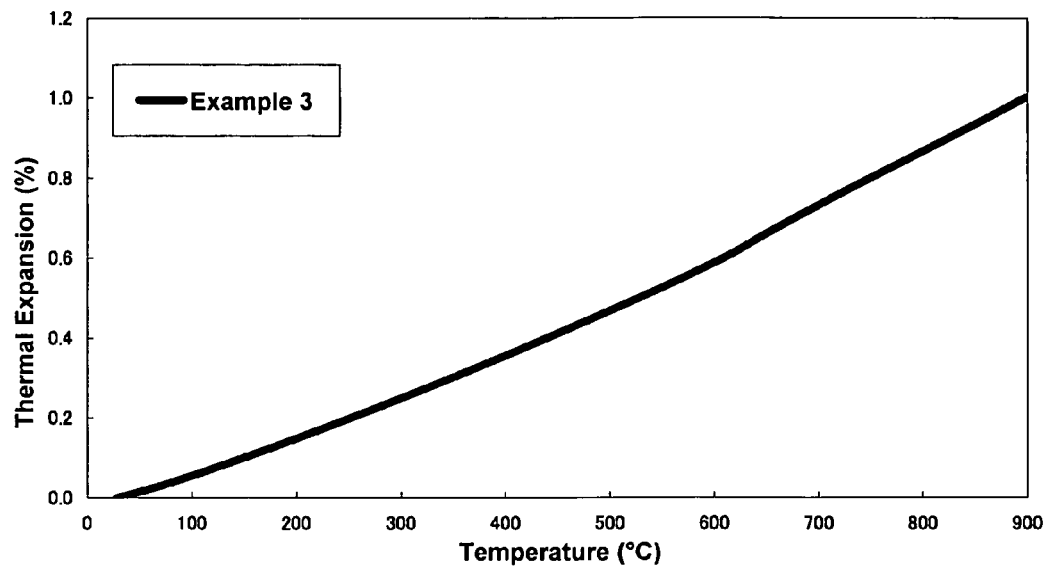
[FIG. 1] The thermal expansion curve of the sintered product of Example 3.

By, for example, making a paste with the glass powder, filling with it where a seal is to be provided of a SOFC consisting of a fuel manifold and cells, and by firing the paste, the sealing glass composition according to the present invention will bond to both surfaces of the ceramic and the metal of which the fuel manifold and the cells are configured, and, turning to crystallized glass there, provide a seal between them. The firing may be carried out at a temperature of not more than 900° C. (e.g., at 900° C.).

The glass powder consisting of the sealing glass composition according to the present invention may be produced by combining the raw material metal oxides, mixing and melting them (e.g., at 1400-1500° C.), cooling the melt to form bulk glass (not yet crystallized), and then pulverizing it.

In the present invention, "substantially free of alkali metals" means that any raw material is never employed whatsoever that contains an alkali metal as one of its main components, and is not meant to exclude the adoption of those which are contaminated with a trace amount of alkali metals originating from impurities in the component raw materials for the glass, and in inorganic fillers as well. The content of alkali metals in the sealing glass composition according to the present invention is preferably not higher than 100 ppm, more preferably not higher than 30 ppm, and particularly preferably not higher than 10 ppm.

From the view point of protection of the environment, the sealing glass of the present invention is preferably lead-free (i.e., content of lead is less than 1000 ppm). Therefore, addition of a material containing lead should be avoided.

In the sealing glass composition according to the present invention, $SiO_2$, which is a component acting as a glass network-former, is an essential component for stabilization of the glass to prevent crystallization from taking place during the production of the bulk glass of which the glass powder is prepared, as well as for formation of $CaO$—$MgO$—$SiO_2$-based (diopside and the like) or $MgO$—$SiO_2$-based (e.g., forsterite and the like) highly expansible crystals in the firing process after pulverization. A composition which will chiefly precipitate $CaO$—$MgO$—$SiO_2$-based crystals (diopside and the like) is likely to undergo less transformation of crystalline phase at firing temperatures and to exhibit stabilization in the strength of the bulk prepared by crystallization.

On the other hand, if crystals are present in the bulk glass, glass powder prepared by its pulverization would show earlier start of crystallization while being fired to in order to form a seal. This is undesirable, for it would bring about reduction in the flowability of the composition at earlier stages after the start of firing, and through the inhibition of the flow of the composition, result more likely in the problem that gaps would be left after firing between the glass and the objects to be sealed. A lower content of $SiO_2$ than 10% by mass would be undesirable, for it would reduce the stability of the bulk glass while it is produced. On the other hand, a content of $SiO_2$ exceeding 30% by mass would be undesirable, too. This is because, with the content above 30% by mass, the linearity of the thermal expansion curve of the crystallized glass formed through firing would be impaired, with a point of inflection appearing on it, within the temperature range corresponding to which a considerable amount of shear stress and strain would occur at the sealed part, in the interface of the objects sealed and the crystallized glass, thereby creating causes of cracks and separation. Therefore, the content of $SiO_2$ is preferably not less than 10% by mass, more preferably not less than 12% by mass, still more preferably not less than 14% by mass, and preferably not more than 30% by mass, more preferably not more than 25% by mass, still more preferably not more than 20% by mass and particularly preferably not more than 18% by mass. Thus, the content of $SiO_2$ may be, for example, 10-30% by mass, 12-25% by mass, or 14-20% by mass, and so on.

$B_2O_3$ is a component acting as a glass network-former, and an essential one for stabilization of the glass to prevent crystallization from taking place during the production of the bulk glass, as well as for formation of $MgO$—$B_2O_3$ or $CaO$—$B_2O_3$-based, highly expansible crystals during the firing after pulverization. A lower content of $B_2O_3$ than 20% by mass would be undesirable, for it would reduce the stability of the bulk glass and render it more likely to allow crystals to precipitate while it is produced. That the precipitation of crystals during the production of the bulk glass is not desirable as stated above in relation to the content of $SiO_2$. A higher content of $B_2O_3$ exceeding 30% by mass would be undesirable, for it would impair the linearity of the thermal expansion curve (a point of inflection appears). Thus, the content of $B_2O_3$ is preferably not less than 20% by mass, more preferably not less than 22% by mass, still more preferably not less than 24% by mass, and preferably not more than 30% by mass, more preferably not more than 28% by mass, still more preferably not more than 26% by mass. Thus, the content of $B_2O_3$ may be, for example, 20-30% by mass, 22-30% by mass, or 24-28% by mass, and so on.

A smaller ratio by mass of $SiO_2$ content/$B_2O_3$ content than 0.33 would be undesirable, for it would reduce the stability of the bulk glass while it is produced. Further, a ratio by mass of $SiO_2$ content/$B_2O_3$ content equal to or greater than 1.33 would be undesirable, for it would lead to an insufficient degree of crystallinity after the firing of the seal, with higher proportion of the glass phase being left relative to the crystalline phase, thereby a point of inflection (glass transition point) would appear in the thermal expansion curve of the glass, which would create strain in the seal. Thus, the ratio by mass of $SiO_2$ content/$B_2O_3$ content is preferably not less than 0.33, more preferably not less than 0.45, still more preferably not less than 0.5, and preferably not more than 1.33, more preferably not more than 1.3, and particularly preferably not more than 1.25. The coefficient of thermal expansion can be finely adjusted by changing this ratio (briefly, a higher ratio will lead to a lower coefficient of thermal expansion). Therefore, in the case where the coefficient of thermal expansion differs between the metal and the ceramic employed in the cells of SOFC, they can be matched by stacking several layers of the material among which this ratio differs from one another CaO is an essential component for the formation of $CaO$—$B_2O_3$-based, $CaO$—$MgO$—$B_2O_3$-based, or $CaO$—$MgO$—$SiO_2$-based, highly expansible crystals. A lower CaO content than 10% by mass, or its content exceeding 40% by mass, would be undesirable, for it would reduce the stability of the bulk glass while it is produced, and bring about reduction in the flowability of the composition, thereby inhibiting the flow of the composition. Thus, the content of CaO is preferably not less than 10% by mass, more preferably not less than 15% by mass, still more preferably not less than 20% by mass, and preferably not more than 40% by mass, more preferably not more than 36% by mass, still more preferably not more than 31% by mass.

MgO is an essential component for the formation of MgO—$SiO_2$-based, MgO—$B_2O_3$-based, CaO—MgO—$B_2O_3$-based, or CaO—MgO—$SiO_2$-based, highly expansible crystals. A lower content of MgO than 15% by mass would be undesirable, for it would lead insufficient degree of crystallinity after the firing of the seal, with higher proportion of the glass phase being left relative to the crystalline phase, resulting thereby impaired heat resistance. And a MgO content exceeding 40% by mass would be undesirable, for it would reduce the stability of the bulk glass while it is produced, bringing about reduction in the flowability of the composition during the firing of the seal to inhibit of its flow. Thus, the content of MgO is preferably not less than 15% by mass, more preferably not less than 20% by mass, still more preferably 22% by mass, and preferably not more than 40% by mass, more preferably not more than 35% by mass, and still more preferably no more than 30% by mass.

A ratio by mass of CaO content/MgO content less than 0.4, or greater than 2.0, would be undesirable, for it would reduce the stability of the bulk glass while it is produced, leading to reduction in the flowability of the composition during the firing of its powder and inhibiting the flow of it. And there is a tendency that the lower the ratio by mass of CaO content/MgO content is in the glass composition, the rarer is the occurrence of the transformation of the crystalline phase at the firing temperature, thus exhibiting stabilized strength of the bulk formed through crystallization. Thus, in view of these, the ratio by mass of CaO content/MgO content is preferably not less than 0.4, more preferably not less than 0.45, still more preferably not less than 0.66, particularly preferably not less than 1.1, and preferably not more than 2, more preferably not more than 1.6, still more preferably not more than 1.4. The ratio by mass of CaO content/MgO content, therefore, may be, for example, 0.45-1.4, 0.66-1.25 and so on, 1.1-1.25, and so on. By changing this ratio, it is possible to finely adjust the flowability of the composition during the firing of the seal and the degree of crystallinity (i.e., increasing this ratio will lead to decrease in the coefficient of thermal expansion).

A sum total of the content of $SiO_2$ and the $B_2O_3$ that is less than 30% by mass would be undesirable, for it would reduce the stability of the bulk glass while it is produced. And a sum total exceeding 50% by mass would be undesirable, for it would lower the coefficient of thermal expansion of the bulk glass. Thus, the sum total of the content of $SiO_2$ and the $B_2O_3$ is preferably not less than 30% by mass, more preferably not less than 33% by mass, still more preferably not less than 35% by mass, particularly preferably not less than 40% by mass, and preferably not more than 50% by mass, more preferably not more than 48% by mass, still more preferably not more than 45% by mass, and particularly preferably not more than 43% by mass. The sum total of the content of $SiO_2$ and $B_2O_3$, therefore, may be, for example, 35-50% by mass, 40-48% by mass, and so on.

A sum total of the content of CaO and MgO that is less than 44% by mass would be undesirable, for it would lead to an insufficient degree of crystallinity after the firing of the seal, with higher proportion of the glass phase being left relative to the crystalline phase. A sum total of the content of CaO and MgO exceeding 65% by mass would be undesirable, for it would reduce the stability of the bulk glass while it is produced. Thus, the sum total of the content of CaO and MgO is preferably not less than 44% by mass, more preferably not less than 48% by mass, still more preferably not less than 50% by mass, and preferably not more than 65% by mass, more preferably not more than 63% by mass, and particularly preferably not more than 61% by mass.

BaO, SrO and ZnO are components which serve in the adjusting of the degree of crystallinity and to retain the adhesive force to metals. A sum total of the content of BaO, SrO and ZnO exceeding 10% by mass would be undesirable, for it would not only lead to an insufficient degree of crystallinity after the firing of the seal, with higher proportion of the glass phase being left relative to the crystalline phase, thereby resulting in impaired heat resistance, but also accelerate corrosion through their reaction with the surface of the metal. Thus, the sum total of the content of BaO, SrO and ZnO is preferably not more than 10% by mass, more preferably not more than 5% by mass, and still more preferably not more than 1% by mass.

$La_2O_3$ is a component which serves in the adjusting of the degree of crystallinity and to retain the adhesive force to metals. A $La_2O_3$ content exceeding 5% by mass would be undesirable, for it would reduce the stability of the bulk glass while it is produced. Thus, the content of $La_2O_3$ is preferably not more than 5% by mass, and more preferably 0.1-3% by mass.

$Al_2O_3$ is a component which serves to improve the stability of the bulk glass while it is produced, and in the adjusting of the crystallization start temperature, and for retention of the adhesive force to metals. An $Al_2O_3$ content exceeding 5% by mass would be undesirable, for it would lower the coefficient of thermal expansion of the bulk glass. Thus, the content of $Al_2O_3$ is preferably not more than 5% by mass, and more preferably 0.5-3% by mass.

$RO_2$ (wherein R denotes Zr or Ti or Sn) is a component which serves to improve the degree of crystallinity. An $RO_2$ content exceeding 3% by mass would be undesirable, for it would reduce the stability of the bulk glass while it is produced. Thus, the content of $RO_2$ is preferably not more than 3% by mass, and more preferably 0.1-1% by mass.

In addition to the above components, some part of CaO, MgO, BaO, SrO and ZnO may be substituted by $Fe_2O_3$, CuO, CoO, NiO, $Ln_2O_3$ (lanthanoid) and $Bi_2O_3$, in a sum total amount of not more than 3% by mass, for the purpose of improving the stability of the glass while it is produced, for suppression of any of its reaction with the metals, for improvement of adhesion of the sealing material to metals, as well as for controlling the kinds and ratios of crystals which are precipitated.

The glass powder consisting of the glass composition according to the present invention is required to exhibit high flowability during firing, for it, once reducing its volume and softening and flowing, must wet the surfaces of the metal and ceramic during firing. For this, it is preferably prepared, through adjustment of the particle size making use of the conditions of dry pulverization, so that it exhibit the mean particle size of 5-250 μm, and the maximum particle size not greater than 500 μm.

With this regard, use of a fine powder consisting of particles of too small a size would be undesirable, for with such a powder earlier start of crystallization and reduction of flowability of the composition would result during the firing of the seal, thereby inhibiting the flow of the composition, which then would require increased rounds of repeated application and firing of the sealing material, thus leading to the rise of production cost. On the other hand, a rough powder consisting of particles of too large a size would pose a problem that the particles of the powder might sediment and separate itself during the processes of making the powder into a paste and application and drying of the latter. Such a fine powder or a rough powder as noted above may be removed through such a treatment as fractionation to adjust the size of the particles. The mean particle size is preferably not smaller than 5 μm, more preferably not smaller than 15 μm, and preferably not greater than 50 μm, and more preferably not greater than 30 μm. Furthermore, the maximum particle size is preferably not greater than 150 μm, more preferably not greater than 100 μm. Thus, the mean particle size may, for example, be 5-50 μm, with the maximum particle size being 150 μm, or the mean particle size may be 5-30 μm, with the maximum particle size being 100 μm.

The sealing glass composition according to the present invention may be used either in the form of glass powder per se or in the form of its mixture with a ceramic powder, to provide a seal between ceramics and metals. In carrying out the sealing, the glass composition is applied to the object which is to be sealed, through printing or using a dispenser, and it can be fired at a temperature which is not higher than 900° C. As the stainless steel (such as SUS430), which is generally available at a low price, has its heat resistance temperature of about 900° C., that the firing temperature is not higher than 900° C. has a significance.

Furthermore, it is possible to add to the glass powder a zirconia powder, preferably a partially stabilized zirconia powder, in such an amount that will not lower the flowability of the composition during the firing of the seal, in order for fine adjustment of the thermal expansion and for acceleration of crystallization of the glass to increase its strength. An amount of a zirconia powder or a partially stabilized zirconia powder added which is lower than 0.01% by mass relative to the amount of the glass powder would be ineffective, while higher than 20% by mass of it would be undesirable, for it would lower the flowability of the composition during the firing of the seal and thereby inhibit the flow of it. Thus, the amount of a powder of partially stabilized zirconia added preferably 0.01-20% by mass, and more preferably 0.01-5% by mass, and still more preferably 0.01-1% by mass, relative to the amount of the glass powder.

For the same purpose as mentioned about zirconia powder, a powder of magnesia, forsterite, steatite, wollastonite and its precursor (i.e., a material which, when fired, forms wollastonite) may be added to the glass power in such an amount that would not lower the flowability of the composition during the firing of the seal. Lower than 0.01% by mass in the sum total of them added relative to the amount of the glass powder would be ineffective, whereas higher than 5% by mass of them would be undesirable, for it would lower the flowability of the composition during the firing of the seal. Thus, the sum total of magnesia, forsterite, steatite, wollastonite and its precursor added is preferably 0.01-5% by mass, more preferably 0.01-1% by mass, and still more preferably 0.01-0.5% by mass, relative to the amount of the glass powder.

EXAMPLES

The present invention will be described in further detail below with reference to typical examples. However, it is not intended that the present invention be limited by the examples.

[Production of Bulk Glass and Glass Powder]

Examples 1-13 and Comparative Examples 1-7

Raw materials were combined and blended so as to attain each of the compositions of the glass indicated in Tables 1, 2 and 4. Each blend of the raw materials was put in a platinum crucible and melted at 1400-1500° C. for two hours to yield the bulk glass in the form of glass flakes. The glass flakes then were put in a pot mill and dry pulverized until a mean particle size of 30-40 μm was achieved, and, through the removal of rough particles with a sieve of 106-μm apertures, was made a powder of a corresponding one of the Examples and Comparative Examples.

Examples 14-17

Raw materials were combined and blended so as to attain each of the compositions of the glass indicated in Table 3. Each blend of the raw materials was put in a platinum crucible and melted at 1400-1500° C. for two hours to yield the bulk glass in the form of glass flakes. The glass flakes then were put in a pot mill and dry pulverized until a mean particle size of 5-25 μm was achieved, and, through the removal of rough particles with a sieve of 106-μm apertures, was made a powder of a corresponding one of the Examples.

[Test Method]

Each of the glass powders of the Examples and Comparative Examples was measured for their mean particle size according to the method described below, and then fired, and measured for its flow diameter (the diameter after flow had occurred) as a result of this firing, and the coefficient of thermal expansion and softening point of thus sintered product to perform assessment.

(1) Mean Particle Size of the Glass Powder

On a laser scattering particle-size distribution analyzer, $D_{50}$ in the volume distribution mode was determined.

(2) Flow Diameter

Five g of each glass powder prepared by pulverization were dry press molded into a piece of 20 mm in diameter, which then was fired on a basal of plate made of SUS430 at 900° C. A sintered product thus prepared was measured for its maximum diameter. A piece was recorded as "⊚" (particularly good) if its flow diameter was not less than 20 mm, as "◯" (suitable) if the value was not less than 19 mm but less than 20 mm, and as "x" (not suitable) if the value was less than 19 mm.

(3) Coefficient of Thermal Expansion

The sintered produces obtained in (2) above were cut out to prepare test pieces of about 5×5×15 mm. For each test piece, its coefficient of thermal expansion was determined based on the thermal expansion curve produced by raising the temperature from room temperature at a rate of 10° C./min in a TMA measuring apparatus, and using a couple of points on it at 50° C. and 550° C. ($\alpha 1$) or a couple of points on it at 50° C. and 700° C. ($\alpha 2$), respectively.

In addition, as a point of inflection could appear at about 600° C. on the thermal expansion curves, the difference between $\alpha 1$ and $\alpha 2$ as defined above ($\Delta\alpha = \alpha 2 - \alpha 1$) was calculated.

If a test piece exhibited its coefficient of thermal expansion of less than $90 \times 10^{-7}/°$ C., "x" (not suitable) was marked beside the value determined, for such a material would have a problem in its matching with the metals and cells.

(4) Softening Point

On each of the thermal expansion curves produced in (3) above, a temperature was identified at which the expansion turned to shrinkage (where the curve takes a relative maximum), which temperature was regarded as the softening point.

In the process of providing a seal between the cells and metal parts of SOFC, firing is repeated in some cases. Thus, it is undesirable, for a structural material, that a seal glass should soften at a temperature which is lower than 900° C.

A glass was marked, beside its value determined, as "○" (suitable) if its softening point was not less than 900° C., and as "x" (not suitable) if its softening point was less than 900° C.

(5) Corrosiveness

The area of the SUS surface adjacent to the edge of the sintered product obtained in (2) above was visually examined.

If the color of the area of the SUS surface adjacent to the edge of the sintered product was not substantially different from that of the other area of the SUS surface, the product was assessed as "○" (suitable), and if the area of the SUS surface adjacent to the sintered product had turned brown in color, the product was assessed as "x" (not suitable).

(Table 1)

TABLE 1

|  |  | Examples |  |  |  |  |  |  |
|---|---|---|---|---|---|---|---|---|
|  |  | 1 | 2 | 3 | 4 | 5 | 6 | 7 |
| Composition of Glass (wt %) | SiO$_2$ | 25 | 20 | 25 | 15 | 18 | 15 | 15 |
|  | Al$_2$O$_3$ | 2 | 0.5 |  | 4.5 | 1 | 0.5 | 0.5 |
|  | B$_2$O$_3$ | 25 | 25 | 20 | 24 | 24 | 28 | 25 |
|  | CaO | 15 | 14 | 15 | 31 | 31 | 25 | 31 |
|  | MgO | 30 | 30 | 33 | 23 | 23 | 29 | 23 |
|  | BaO |  | 5 | 1 |  |  |  |  |
|  | ZrO$_2$ | 1 | 2.5 | 3 |  |  |  |  |
|  | La$_2$O$_3$ | 2 | 3 | 3 | 2.5 | 3 | 2.5 | 3 |
|  | SnO$_2$ |  |  |  |  |  |  | 2.5 |
| Amount of ceramic powder added (wt %) |  | none | none | none | none | none | none | none |
| α1 (×10$^{-7}$/° C.) |  | 95 | 100 | 105 | 100 | 105 | 110 | 110 |
| Δα (×10$^{-7}$/° C.) |  | 10 | 7 | 8 | 5 | 4 | 4 | 3 |
| Flow diameter (mm) |  | ◉ | ◉ | ○ | ◉ | ◉ | ○ | ◉ |
| Softening point (° C.) |  | ○ | ○ | ○ | ○ | ○ | ○ | ○ |
| Corrosiveness |  | ○ | ○ | ○ | ○ | ○ | ○ | ○ |

[Table 2]

TABLE 2

|  |  | Examples |  |  |  |  |  |
|---|---|---|---|---|---|---|---|
|  |  | 8 | 9 | 10 | 11 | 12 | 13 |
| Composition of Glass (wt %) | SiO$_2$ | 12 | 16 | 15 | 15 | 15 | 15 |
|  | Al$_2$O$_3$ | 3 | 1 | 0.5 | 0.5 | 0.5 | 0.5 |
|  | B$_2$O$_3$ | 24 | 20 | 25 | 25 | 25 | 25 |
|  | CaO | 32 | 30 | 30 | 30 | 30 | 30 |
|  | MgO | 29 | 29 | 24 | 24 | 24 | 24 |
|  | BaO |  |  |  |  |  |  |
|  | ZrO$_2$ |  | 1 | 2.5 | 2.5 | 2.5 | 2.5 |
|  | La$_2$O$_3$ |  | 3 | 3 | 3 | 3 | 3 |
|  | SnO$_2$ |  |  |  |  |  |  |
| Amount of ceramic powder added (wt %) |  | none | none | none | Wollastonite precursor 1% | Zirconia 10% | Magnesia 1% |
| α1 (×10$^{-7}$/° C.) |  | 115 | 115 | 105 | 107 | 107 | 109 |
| Δα (×10$^{-7}$/° C.) |  | 5 | 5 | 4 | 4 | 4 | 4 |
| Flow diameter (mm) |  | ○ | ○ | ○ | ○ | ○ | ○ |
| Softening point (° C.) |  | ○ | ○ | ○ | ○ | ○ | ○ |
| Corrosiveness |  | ○ | ○ | ○ | ○ | ○ | ○ |

Sono-hige (Ube Material Industries, Ltd.) was employed as the wollastonite precursor.

Partially stabilized electrofused zirconia of 325-mesh under (containing 8% Y$_2$O$_3$) was employed as the powder of zirconia.

Electrofused magnesia of 200-mesh under was employed as the powder of magnesia.

[Table 3]

TABLE 3

|  |  | Examples |  |  |  |
|---|---|---|---|---|---|
|  |  | 14 | 15 | 16 | 17 |
| Composition of Glass (wt %) | SiO$_2$ | 18 | 17 | 15 | 15 |
|  | Al$_2$O$_3$ | 4.5 | 3 | 3 | 3 |
|  | B$_2$O$_3$ | 25 | 27 | 27 | 27 |
|  | CaO | 20 | 26 | 29 | 24 |
|  | MgO | 30 | 24 | 22 | 24 |
|  | SrO |  |  | 2 |  |
|  | ZnO |  |  |  | 4 |
|  | La$_2$O$_3$ | 2.5 | 3 | 3 | 3 |
| Amount of ceramic powder added (wt %) |  | none | none | none | none |
| α1 (×10$^{-7}$/° C.) |  | 105 | 105 | 110 | 105 |
| Δα (×10$^{-7}$/° C.) |  | 4 | 6 | 5 | 6 |
| Flow diameter (mm) |  | ◉ | ◉ | ◉ | ◉ |
| Softening point (° C.) |  | ○ | ○ | ○ | ○ |
| Corrosiveness |  | ○ | ○ | ○ | ○ |

[Table 4]

TABLE 4

| | | Comparative Examples | | | | | | |
|---|---|---|---|---|---|---|---|---|
| | | 1 | 2 | 3 | 4 | 5 | 6 | 7 |
| Composition of Glass (wt %) | $SiO_2$ | 20 | 20 | 15 | 15 | 10 | 15 | 15 |
| | $Al_2O_3$ | | 1 | 1 | 1 | | 0.5 | 0.5 |
| | $B_2O_3$ | 35 | 20 | 25 | 25 | 31 | 25 | 25 |
| | CaO | 12 | 15 | 25 | 35 | 17 | 30 | 30 |
| | MgO | 27 | 33 | 14 | 14 | 37 | 24 | 24 |
| | BaO | | 1 | 14 | 5 | | | |
| | $ZrO_2$ | 3 | 3 | 3 | 2 | 2 | 2.5 | 2.5 |
| | $La_2O_3$ | 3 | 7 | 3 | 3 | 3 | 3 | 3 |
| | $SnO_2$ | | | | | | | |
| Amount of ceramic powder added (wt %) | | none | none | none | none | none | Zirconia 25% | Wollastonite precursor 6% |
| α1 (×10$^{-7}$/° C.) | | 88X | 110 | 110 | 100 | 105 | 105 | 105 |
| Δα (×10$^{-7}$/° C.) | | 24 | 12 | 8 | — | 6 | 4 | 4 |
| Flow diameter (mm) | | ◎ | X | ○ | X | X | X | X |
| Softening point (° C.) | | ○ | ○ | 880X | 650X | ○ | ○ | ○ |
| Corrosiveness | | ○ | ○ | X | ○ | ○ | ○ | ○ |

Figure 2:
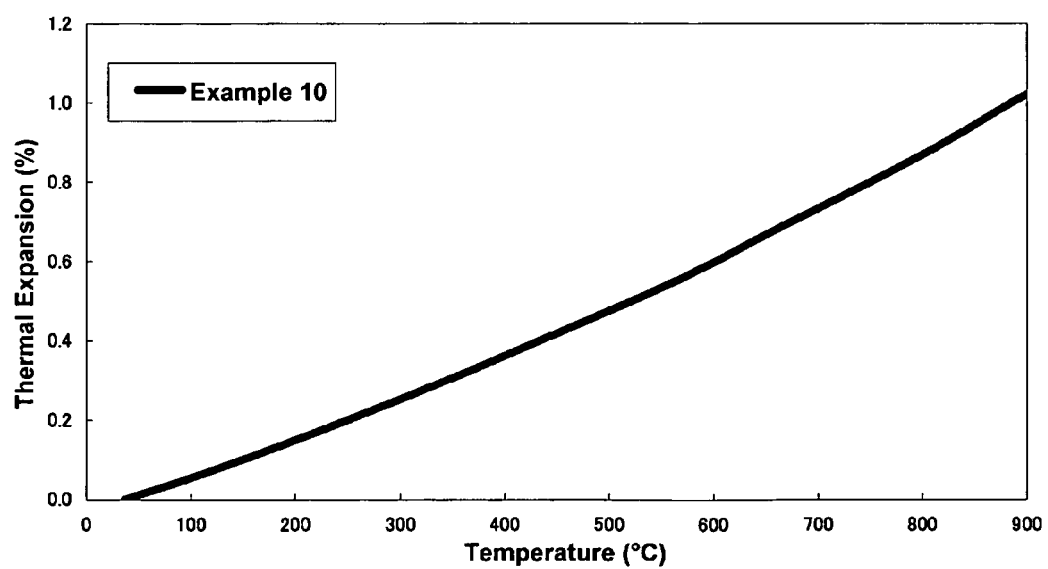
[FIG. 2] The thermal expansion curve of the sintered product of Example 10.
Figure 3:
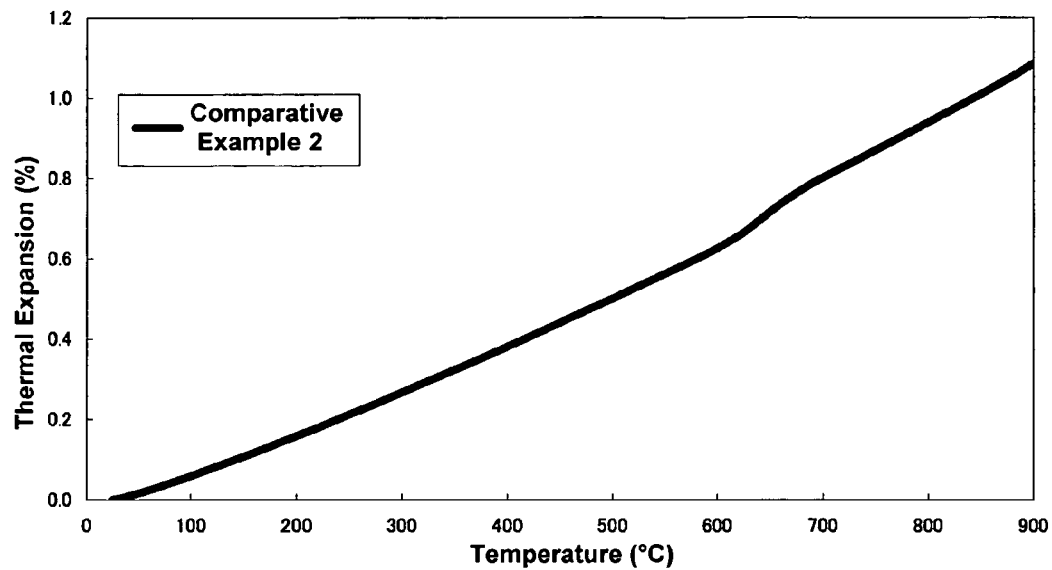
[FIG. 3] The thermal expansion curve of the sintered product of Comparative Example 2.
Figure 4:
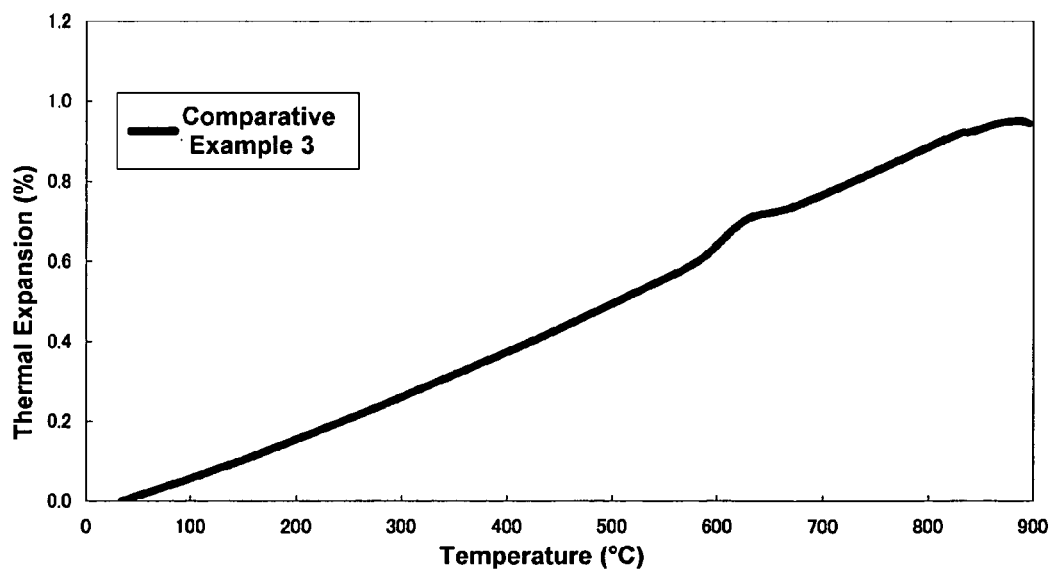
[FIG. 4] The thermal expansion curve of the sintered product of Comparative Example 3.

The results are shown in Tables 1-4. As seen in the tables, while any of the glass compositions of the Comparative Examples lack at least one of the qualities required for a sealing glass, the glass compositions of Examples 1-17 were possessed of all the qualities required for a sealing glass, i.e., the flow diameter after firing, the coefficient of thermal expansion and softening point of their sintered products (crystallized glass). Moreover, as shown in FIGS. 1-4, which are set forth as examples, of the thermal expansion curves of the sintered products of the Examples (3 and 10) (FIGS. 1 and 2, respectively) and those of the Comparative Examples (2 and 3) (FIGS. 3 and 4, respectively), while a point of inflection was observed on the thermal expansion curves of the sintered products of the Comparative Examples, with an abrupt change occurring in the coefficient of thermal expansion by the change of temperature over the point of inflection, the thermal expansion curves of the sintered products of the Examples have no point of inflection, thus exhibiting no abrupt change in the coefficient of thermal expansion by the change of temperature.

INDUSTRIAL APPLICABILITY

The glass composition according to the present invention can be utilized as an alkali metal-free sealant which is suitably applied to the parts to be sealed of solid oxide fuel cells (SOFC) as a means to provide a seal between metal and ceramic, metal and metal, ceramic and ceramic, by firing it in contact with the metal and ceramic at a temperature of not more than 900° C.

The invention claimed is:

1. A glass composition substantially free of alkali metals comprising, calculated as oxides,

| | |
|---|---|
| $SiO_2$ | 10-30% by mass, |
| $B_2O_3$ | 20-30% by mass, |
| CaO | more than 20% to 40% by mass, |
| MgO | 15-40% by mass, |
| BaO + SrO + ZnO | 0-10% by mass, |
| $La_2O_3$ | 0-5% by mass, |
| $Al_2O_3$ | 0-5% by mass, and |
| $RO_2$ | 0-3% by mass (wherein R represents Zr, Ti, or Sn), | wherein a crystallized glass which is formed by firing at 900±50° C. a powder that is made of the glass composition, has a coefficient of thermal expansion of 90-120× 10$^{-7}$/° C. at 50-550° C.

2. The glass composition according to claim 1, wherein a ratio by mass of CaO content/MgO content is 0.4-2.0.

3. The glass composition according to claim 1, wherein a ratio by mass of the $SiO_2$ content/the $B_2O_3$ content is 0.33-1.33.

4. The glass composition according to claim 1, wherein a sum total of the content of $SiO_2$ and $B_2O_3$ is 30-50% by mass, and wherein a sum total of the content of CaO and MgO is 44-65% by mass.

5. A glass powder consisting of the glass composition according to claim 1, wherein a mean particle size of the glass powder is 5-250 μm.

6. A glass-ceramic powder comprising 100 parts by mass of a glass powder consisting of the glass composition according to claim 1 and 0.01-20 parts by mass of zirconia powder.

7. A glass-ceramic powder comprising a glass powder consisting of the glass composition according to claim 1 and one or more ceramic powders selected from the group consisting of magnesia, forsterite, steatite, wollastonite, and a precursor thereof, wherein the glass-ceramic powder contains, per 100 parts by mass of the glass powder, 0.01-5 parts by mass of the one or more ceramic powders selected from the group consisting of magnesia, forsterite, steatite, wollastonite, and a precursor thereof.

8. The glass-ceramic powder according to claim 6, wherein a mean particle size of the glass powder is 5-250 μm.

9. The glass-ceramic powder according to claim 7, wherein a mean particle size of the glass powder is 5-250 μm.

10. A glass powder consisting of the glass composition according to claim 1, wherein a mean particle size of the glass powder is 15-250 μm.

* * * * *